United States Patent

Sachdev

[19]

[11] Patent Number: 5,966,442
[45] Date of Patent: Oct. 12, 1999

[54] REAL-TIME INFORMATION DELIVERY SYSTEM FOR AIRCRAFT

[75] Inventor: Dharmendra Kumar Sachdev, McLean, Va.

[73] Assignee: WorldSpace, Inc., Washington, D.C.

[21] Appl. No.: 08/749,457

[22] Filed: Nov. 15, 1996

[51] Int. Cl.⁶ .............. H09N 7/16; H04B 7/212; H04B 7/185
[52] U.S. Cl. .............. 380/10; 380/33; 348/8; 370/321; 370/325; 455/12.1
[58] Field of Search .............. 380/10, 33, 20, 380/34; 455/12.1, 13.2; 348/8; 370/321, 325

[56] References Cited

U.S. PATENT DOCUMENTS

| | | | |
|---|---|---|---|
| 3,761,813 | 9/1973 | Perrin | 455/13.2 X |
| 5,249,303 | 9/1993 | Goeken | 455/431 |
| 5,283,780 | 2/1994 | Schuchman et al. | |
| 5,463,656 | 10/1995 | Polivka et al. | 380/10 X |
| 5,521,979 | 5/1996 | Deiss | 380/20 |
| 5,835,487 | 11/1998 | Campanella | 370/316 |
| 5,864,546 | 1/1999 | Campanella | 370/316 |
| 5,867,490 | 2/1999 | Campanella | 370/326 |
| 5,870,390 | 2/1999 | Campanella | 370/326 |

OTHER PUBLICATIONS

S. Joseph Campanella, "Communications Satellites: Orbitting Into The '90s", *IEEE Spectrum*, Aug. 1990, pp. 49–52.

FCC Form 493 Application, Sky Radio Partners d/b/a USA Today Sky Radio, Nov. 4, 1991 (including Exhibits 1–6).

B. Rowe, "Sky Radio Takes Off", *Satellite Communications*, Dec. 1992, p. 40.

G. Losquadro, "Digital Audio Broadcasting: Hi–Grade Service Quality Through On–Board Processing Techniques" (1995).

*Primary Examiner*—Gilberto Barron, Jr.
*Attorney, Agent, or Firm*—Roylance, Abrams, Berdo & Goodman, LLP

[57] ABSTRACT

A satellite-based digital broadcast system is used to provide real-time news, entertainment and informational programs to aircraft passengers in flight. Transmissions from the satellite occur on a time division multiplex (TDM) downlink with different broadcast programs being transmitted on different TDM channels. A broadcast receiver is carried on board the aircraft, and includes a demultiplexer for demultiplexing the TDM channels to reproduce the original broadcast programs. The broadcast receiver may be adapted to receive and reproduce both audio and video broadcasts, as well as to provide other types of information delivery services. Encryption of the broadcast programs may be used to restrict their use to a specific aircraft or airline company.

16 Claims, 4 Drawing Sheets

REAL-TIME INFORMATION DELIVERY SYSTEM FOR AIRCRAFT

CROSS REFERENCE TO RELATED APPLICATIONS

Related subject matter is disclosed and claimed in U.S. patent application Ser. No. 08/569,346, filed by S. Joseph Campanella on Dec. 8, 1995, now U.S. Pat. No. 5,835,487; in U.S. patent application Ser. No. 08/746,018, filed by Robert L. Johnstone et al. on Nov. 5, 1996 now U.S. Pat. No. 5,898,680; in U.S. patent application Ser. No. 08/746,019, filed by S. Joseph Campanella on Nov. 5, 1996, now U.S. Pat. No. 5,867,490; in U.S. patent application Ser. No. 08/746,067, filed by S. Joseph Campanella on Nov. 5, 1996, now U.S. Pat. No. 5,870,390; in U.S. patent application Ser. No. 08/746,020, filed by S. Joseph Campanella on Nov. 5, 1996, now U.S. Pat. No. 5,864,546; in co-pending U.S. patent application Ser. No. 08/746,069, filed by S. Joseph Campanella et al. on Nov. 5, 1996; in co-pending U.S. patent application Ser. No. 08/746,070, filed by S. Joseph Campanella on Nov. 5, 1996; in co-pending U.S. patent application Ser. No. 08/746,071, filed by S. Joseph Campanella on Nov. 5, 1996; and in co-pending U.S. patent application Ser. No. 08/746,072, filed by S. Joseph Campanella on Nov. 5, 1996; all of said applications being expressly incorporated herein by reference.

FIELD OF THE INVENTION

The present invention relates generally to the transmission and reception of information, and is particularly concerned with a system for providing real-time audio, video and data transmissions to airline passengers.

BACKGROUND OF THE INVENTION

Modern aircraft provide passengers a variety of entertainment programs, including movies, science features, advertising, news, music and other types of video and audio programs. However, all of these programs are pre-recorded (usually on magnetic tape), sometimes days or months prior to the commencement of the flight. As a result, while today's airline passengers are increasingly able to take advantage of high-technology services, such as in-flight telephone calls, they are cut off from live news, sports events and other events that occur during the course of a flight. Thus, it is quite common to witness airline passengers rushing to the nearest television set immediately after their flights have landed at an airport, particularly if a major news or sports event is taking place. In some cases, even that option is not available because the event is taking place at a distant location and is not of local interest at the passenger's destination.

Although aircraft are capable of receiving radio and television broadcast transmissions from terrestrial sources, this is not a practical way to provide real-time news and entertainment programs to airline passengers. One problem is that the effective range of most commercial radio and television broadcast stations is limited to a distance on the order of 100 kilometers. For a turbine aircraft flying at a speed in excess of 750 kilometers per hour, it is apparent that the aircraft will be within range of a terrestrial broadcast station only for a short period of time. This time interval will typically be less than the duration of most types of news and entertainment programs. Another problem with receiving terrestrial transmissions is that the relative distance between the aircraft and the broadcast station changes quickly as the aircraft travels along its flight path, resulting in large variations in signal strength and transmission quality. Moreover, for terrestrial transmissions which are capable of being received over long distances, the blocking effect of the earth's horizon can interfere with proper signal reception.

In co-pending, commonly-assigned U.S. patent application Ser. No. 08/569,346, filed by S. Joseph Campanella on Dec. 8, 1995, now U.S. Pat. No. 5,835,487, and in the other co-pending applications identified previously, a new global digital broadcast system is described. The system employs three geostationary satellites, each having three contiguous downlink spot beams covering large land masses. The primary intended mode of reception is a portable radio receiver, with the ability to select one of several hundred 16 kilobit per second (kbps) prime rate channels. These channels can be used individually for audio or text broadcasts, or they can be combined to form digital streams as wide as 1.5 to 2.0 megabits per second (mbps). Depending upon the mode selected, the uplink signals for these broadcasts can originate either from a central hub located at a discrete site within the uplink coverage area of a satellite, or from a plurality of individual Very Small Aperture Terminals (VSATs) distributed throughout the uplink coverage area of the satellite. Underlying the present invention is the recognition that a satellite-based digital broadcast system of this type can be used to provide real-time broadcast programs to aircraft in flight, without suffering from the disadvantages and limitations of the prior art.

SUMMARY OF THE INVENTION

In view of the foregoing, it is an object of the present invention to provide a system for delivering real-time broadcast programs to aircraft passengers which does not suffer from significant range limitations, signal strength variations or horizon blocking problems.

A further object of the present invention is to deliver broadcast programs to aircraft on multiple channels, so that airline passengers can select from among a large number of different programs.

A further object of the present invention is to provide both audio and video broadcast programs to airline passengers, as well as other types of information delivery services.

A still further object of the present invention is to make it possible to restrict certain broadcast programs so that they can be received only by certain aircraft or groups of aircraft, so that broadcast programs tailored to specific airline companies can be reserved for use by those companies.

These and other objects of the present invention are achieved by using a satellite-based digital broadcast system to provide real-time broadcast programs to aircraft in flight. Because of the wide area of geographic coverage that can be obtained with a satellite, the aircraft will remain within range of the satellite for a sufficiently long period of time to allow most types of live broadcast programs to be received in an uninterrupted manner. Moreover, due to the great distance between the satellite and the aircraft (particularly in the case of a geostationary satellite), problems arising from signal strength variations and horizon blocking are minimized.

In one aspect, therefore, the present invention is directed to a system for providing real-time broadcast programs to aircraft passengers. The system comprises at least one terrestrial broadcast station for transmitting a plurality of different broadcast programs, and a relay satellite for receiving and retransmitting the broadcast programs. The retransmission from the relay satellite occurs on a time division multiplex (TDM) downlink with different ones of the broadcast programs being transmitted on different TDM channels in the downlink. A broadcast receiver is carried on board the aircraft, and includes a demultiplexer for demultiplexing the TDM channels to reproduce the original broadcast programs. Preferably, the broadcast receiver is adapted to receive and reproduce both audio and video broadcasts, as well as to provide other types of information delivery services. In a preferred embodiment of the invention, at least one of the TDM channels contains an encrypted broadcast program, and the broadcast receiver is adapted to decrypt the encrypted broadcast program so that the program can be restricted to a specific aircraft or airline.

In another aspect, the present invention is directed to an on-board broadcast receiver for providing a plurality of real-time broadcast programs to aircraft passengers. The broadcast programs are transmitted to the receiver by a satellite on a time division multiplex (TDM) downlink, with different ones of the broadcast programs being transmitted on different TDM channels in the downlink. The broadcast receiver comprises a satellite antenna carried by the aircraft for receiving the TDM downlink, a demodulator coupled to the antenna for demodulating the TDM downlink, and a demultiplexer coupled to the demodulator for demultiplexing the TDM downlink to reproduce the original broadcast programs.

In a still further aspect, the present invention is directed to a method for providing real-time broadcast programs to aircraft passengers. The method comprises the steps of transmitting a plurality of different broadcast programs from at least one terrestrial broadcast station to a relay satellite; retransmitting the broadcast programs from the relay satellite to an aircraft in flight, such retransmission occurring on a time division multiplex (TDM) downlink signal with different ones of the broadcast programs being transmitted on different TDM channels in the downlink signal; and receiving and demultiplexing the downlink signal on board the aircraft to reproduce the original broadcast programs.

BRIEF DESCRIPTION OF THE DRAWINGS

The various objects, advantages and novel features of the present invention will be more readily understood from the following detailed description when read in conjunction with the appended drawings, in which.

Throughout the drawings, like reference numerals will be understood to refer to like parts and components.

DETAILED DESCRIPTION OF THE PREFERRED EMBODIMENT

Figure 1:
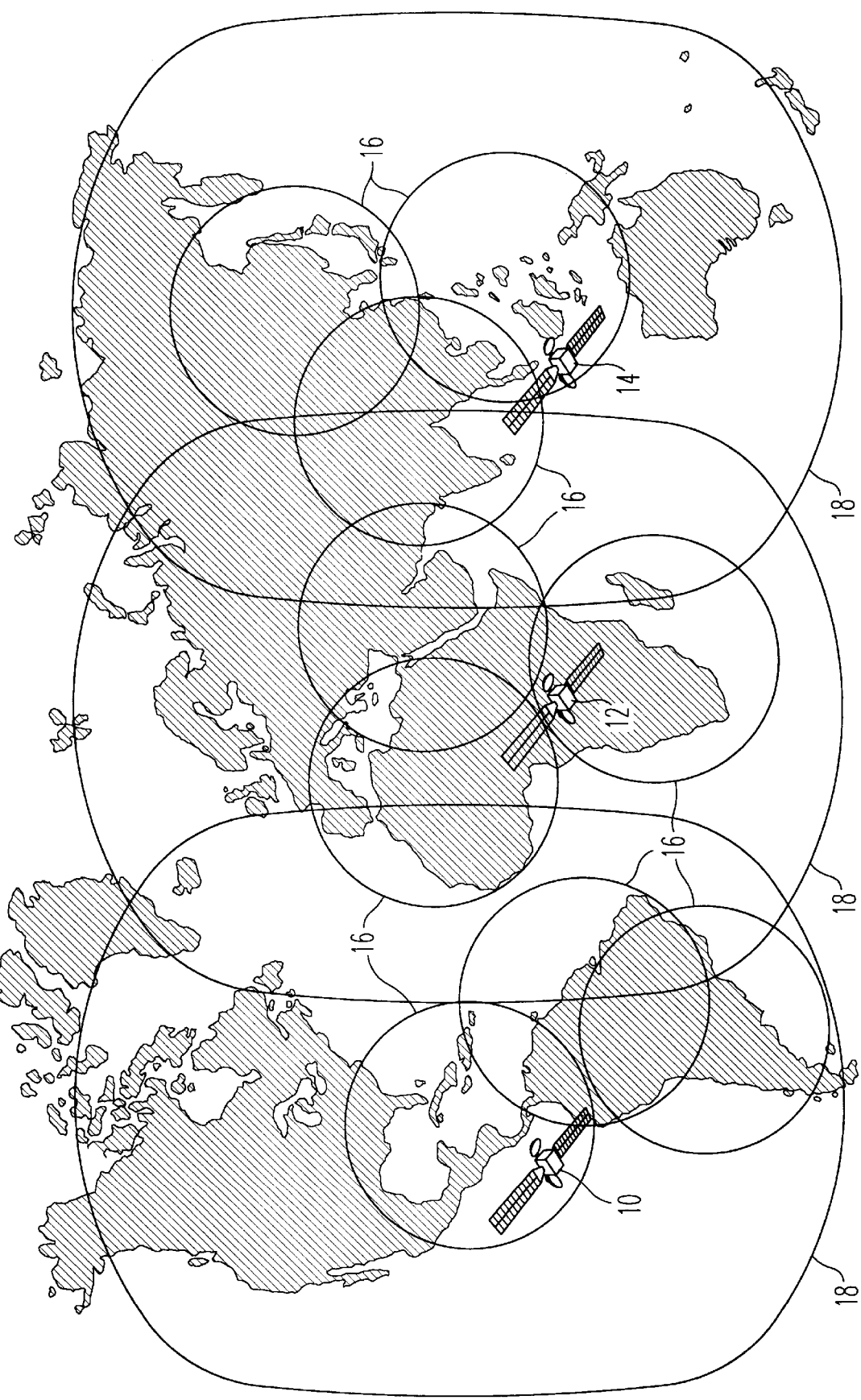
FIG. 1 is an illustration of a satellite-based digital broadcast system utilizing three geostationary satellites which cover the principal land masses outside the United States and Europe.

A system for providing real-time broadcast programs to aircraft in accordance with the present invention is preferably implemented in connection with a satellite-based digital broadcast system of the type described in the aforementioned co-pending U.S. patent application Ser. No. 08/569,346, filed Dec. 8, 1995, now U.S. Pat. No. 5,835,487, and in the other co-pending applications identified previously. As shown in FIG. 1, digital broadcast system preferably consists of three geostationary satellites 10, 12 and 14 positioned above the principal land masses of the earth outside the United States and Europe. Thus, the satellite 10 provides service to Latin America and South America, the satellite 12 provides service to Africa and the Middle East, and the satellite 14 provides service to the southern and eastern regions of Asia. The downlink coverage area of each satellite 10, 12 and 14 is defined by three contiguous spot beams 16. The uplink coverage area 18 of each satellite 10, 12 and 14 is substantially larger, and defines the area in which ground-based broadcast stations may be placed. As win be apparent from FIG. 1, the coverage afforded by the three contiguous downlink spot beams 16 of each satellite 10, 12 and 14 is very large in size, and an aircraft will typically remain within the downlink coverage area of a satellite for several hours as it proceeds along its flight path. In a preferred embodiment of the system shown in FIG. 1, downlink transmissions occur in the frequency band of 1467 to 1492 megahertz (MHz), which has been allocated for Broadcast Satellite Service (BSS) Digital Audio Broadcast (DAB). This is within the L band of radio frequencies (1100 to 2000 MHz). Uplink transmissions from the broadcast stations (not shown) to the satellites 10, 12 and 14 use frequencies between 7050 and 7075 MHz, which is in the X band.

Each downlink spot beam 16 from a given satellite 10, 12 or 14 covers approximately 14 million square kilometers within power distribution contours that are 4 decibels (dB) down from beam center, and 20 million square kilometers within contours that are 8 dB down from beam center. The beam center margin is 14 dB based on a receiver gain-to-temperature ratio of −13 dB/K.

Figure 2:
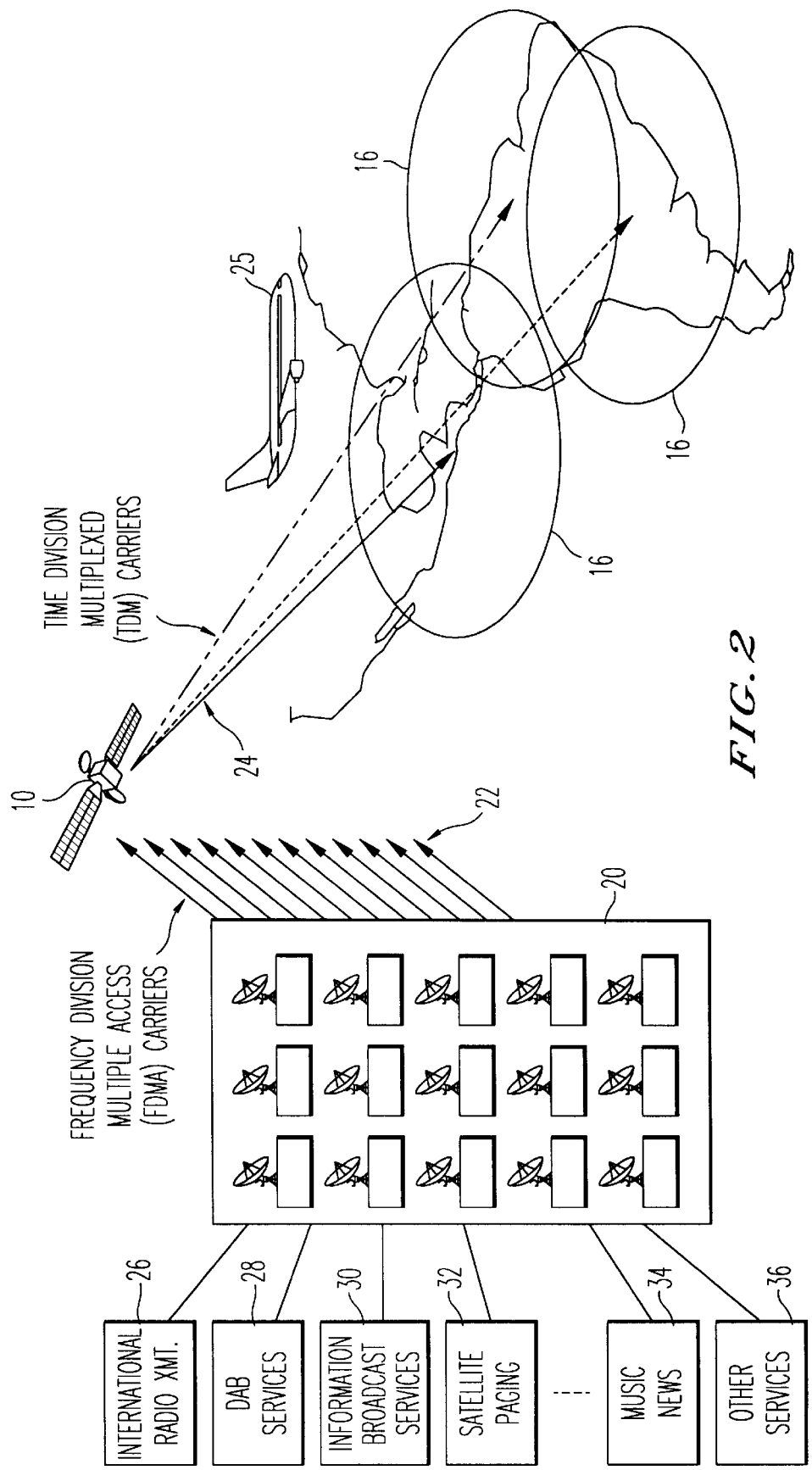
FIG. 2 is a diagram illustrating the manner in which a satellite-based digital broadcast system of the type illustrated in FIG. 1 can be used to provide audio programs, information delivery services and other relatively low-bandwidth broadcast transmissions directly to an aircraft in flight over the earth.

Referring now to FIG. 2, uplink signals generated by a plurality of VSAT-type broadcast stations 2 are modulated on up to 288 separate frequency division multiple access (FDMA) channels 22 and are transmitted to one of the satellites. The satellite 10 is shown merely by way of example, although it will be understood that similar signals are transmitted to the satellites 12 and 14 by broadcast stations located in their respective coverage regions. Each broadcast station 20 preferably has the ability to uplink directly from its own facilities to the satellite 10 and to place one or more 16 kilobit per second (kbps) prime rate increments on a single carrier. Use of FDMA channels 22 for the uplink transmissions allows for a significant degree of flexibility between multiple independent broadcast stations 20. Prime rate increments (PRIs) are preferably the fundamental building block or rudimentary unit used in the system for channel size, and can be combined to achieve higher bit rates. For example, 8 PRIs can be combined to create program channels at bit rates of up to 128 kbps.

Conversion between the uplink FDMA channels 22 and downlink multiple-channel-per-carrier, time division multiplex MCPC/TDM) channels 24 is achieved on-board the satellite 10 at the baseband level. Each prime rate channel transmitted by a broadcast station 20 is demultiplexed into individual 16 kbps baseband signals. The individual channels are then routed to one or more of the downlink beams 16, each of which operates at a single carrier frequency. This baseband processing provides a high level of channel control in terms of uplink frequency allocation and channel routing between uplink and downlink signals. Further details concerning the operation of the satellite 10 and broadcast stations 20 can be found in the aforementioned co-pending patent application Ser. No. 08/569,346, now U.S. Pat. No. 5,835,487.

The satellite 10 contains two communication payloads. In the first payload, referred to as the "processing" payload, a polyphase demultiplexer and demodulator receives the individual FDMA uplink signals 22, generates a composite signal on which the data of the 288 FDMA signals is time multiplexed, and performs a high speed demodulation of the serial data. A routing switch selectively directs individual channels of the serial data into all, some or none of the downlink spot beams 16 and further modulates and down-converts the three downlink signals. Traveling wave tube amplifiers amplify the three downlink signals, which are radiated to earth by L-band transmit antennas.

The second type of communication payload carried by the satellite 10 (which is not used in FIG. 2 but is discussed below in connection with FIG. 3) is a "transparent" payload that converts uplink digital carriers from frequency locations in the X-band uplink spectrum to frequency locations in the L-band downlink spectrum. The digital carrier stream for the transparent payload is generated and modulated with video programming at a broadcast station, transmitted to the satellite 10, received and frequency-converted to a downlink frequency, amplified by a traveling wave tube amplifier, and transmitted on one of the downlink beams 16. Different downlink carrier frequencies are used for the transparent and processing payloads of the satellite 10.

FIG. 2 illustrates the manner in which audio broadcasts and other relatively low-bandwidth information delivery services may be provided to an aircraft 25 using the processing payload of the satellite 10. The aircraft 25 is in flight above the earth at a location within the coverage area defined by the three contiguous downlink spot beams 16 transmitted by the satellite 10. Broadcast programs intended for the aircraft 25 are transmitted to the satellite 10 by one or more of the broadcast stations 20 using the FDMA uplinks 22. The processing payload on board the satellite 10 routes the 16 kbps prime rate channels to one or more of the downlink beams 16, as determined by a ground-based control facility (not shown). Programming sources for the broadcast stations 20 include international radio transmission services 26 (such as VOA or BBC), digital audio broadcast (DAB) services 28, information broadcast services 30 (such as the PointCast news service available on the Internet), satellite paging services 32, music and news programs 34, and other services 36 (such as stock market quotes, weather forecasts, emergency announcements and the like). The satellite paging service 32 may be provided by paging the aircraft 25 as a whole, and transmitting alphanumeric information indicating the name of the passenger and a brief message for that passenger.

It will be understood that each of the broadcast sources 26–36 may be associated with a separate one of the broadcast stations 20, or several of the sources 26–36 may be transmitted from a single broadcast station 20. Each broadcast station may transmit up to 32 prime rate channels of 16 kbps each, and the overall uplink capacity of the system is 288 prime rate uplink channels. Ninety-six (96) prime rate channels are selected and multiplexed by the satellite 10 for transmission in each downlink beam 16. The number of channels transmitted by each broadcast station 20 will depend upon the type of broadcast source (or sources) involved, with a single 16 kbps channel being sufficient for monophonic voice programs, data services and the like. FM-quality monophonic music can be transmitted using two 16 kbps prime rate channels, FM-quality stereophonic music can be transmitted using four 16 kbps prime rate channels, and CD-quality stereophonic music can be transmitted using eight 16 kbps prime rate channels. All of the quoted bit rates are for audio sources coded using MPEG 2, Layer 3 coding.

In the arrangement shown in FIG. 2, the program content of some of the downlink channels can be common to both airline passengers and listeners on the ground. This provides airline passengers with the option of listening in real time to the same radio programs, sports events and other broadcast programs that they receive at home. Other channels can be specially packaged for airline use by including advertising or program content that this specifically targeted to airline passengers. These channels can be encrypted by the sources 26–36 and then decrypted in the receiving equipment carried aboard the aircraft 25. The encryption may be specific to one airline company, or, for programs which might appeal to airline passengers generally, shared by a number of different airline companies.

Figure 3:
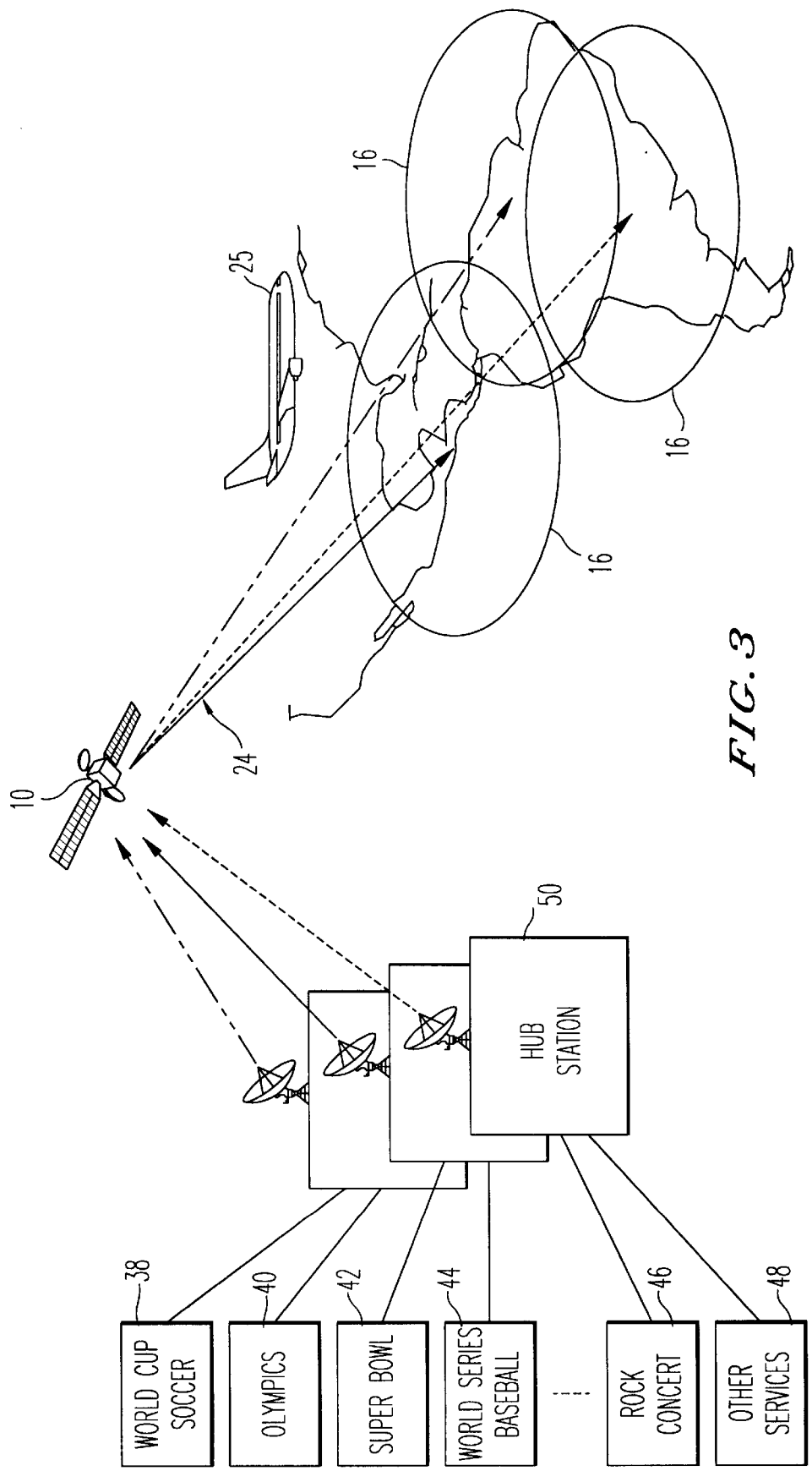
FIG. 3 is a diagram illustrating the manner in which a satellite-based digital broadcast system of the type illustrated in FIG. 1 can be used to provide video programs and other relatively high-bandwidth broadcast transmissions directly to an aircraft in flight over the earth.

FIG. 3 illustrates the manner in which the transparent payload of the satellite 10 may be used to provide video broadcast programs and other high-bandwidth information delivery services to the aircraft 25. In this case, the broadcast sources will typically consist of real-time video feeds from live sporting events, live news events or live performances. In the example shown, the broadcast sources comprise live video feeds from a World Cup Soccer match 38, an Olympic event 40, a Super Bowl football game 42, a World Series baseball game 44, and a rock concert 46. The broadcast source may also consist of a live video feed from an important news event (such as an inauguration, state funeral, royal marriage or the like) as represented by block 48. In all of these cases, the uplink transmissions 49 originate not from small VSAT-type broadcast stations 20 as in the case of FIG. 2, but instead from larger hub stations 50 which are capable of transmitting at higher bandwidths. With currently available compression techniques, a bandwidth of 1.5 to 2.0 mbps is sufficient to transmit full motion video with acceptable quality. To achieve the desired bandwidth, the bandwidth for multiple TDM downlink channels is combined in the broadcast station. For example, if the bandwidth of 96 TDM channels is combined, the aggregate bit rate will be 1.536 mbps.

Figure 4:
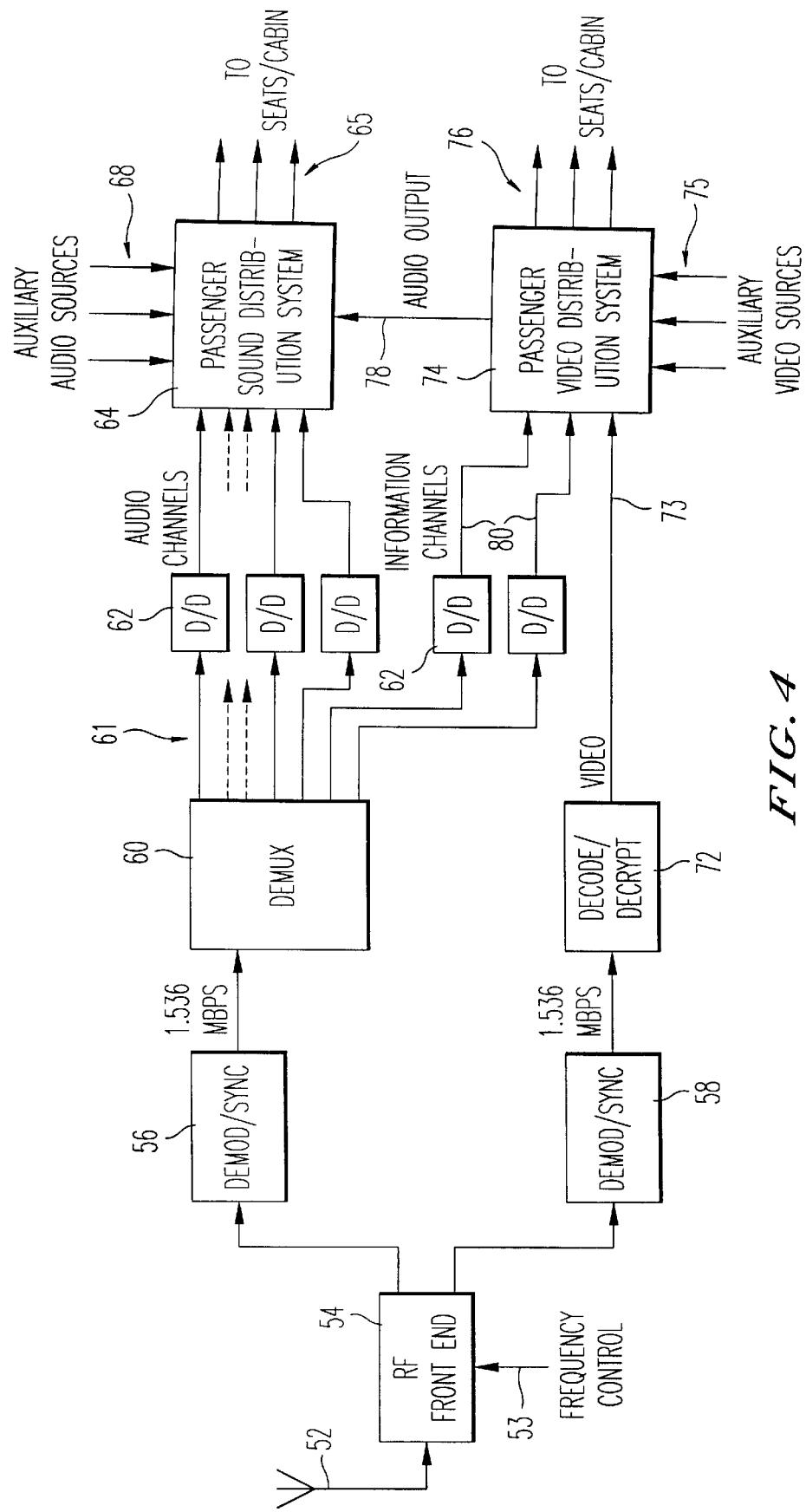
FIG. 4 illustrates the details of an on-board broadcast receiver and other equipment that can be installed in an aircraft to provide real-time broadcast programming in accordance with the principles of the present invention.

FIG. 4 illustrates the equipment that is carried on board the aircraft 24 for receiving and reproducing broadcast programs relayed through one of the satellites 10, 12 or 14 of FIG. 1. The TDM downlink beam 16 is received by an antenna 52 that is mounted on the upper exterior surface of the aircraft fuselage. The antenna 52 is connected to an RF front end 54 which may be manually or automatically switched (via an input 53) between or among the carrier frequencies associated with the three separate downlink beams 16 transmitted by each satellite. The RF front end 54 receives all 96 TDM channels associated with the processing payload of the satellite, as well as all 96 digital carriers associated with the transparent payload of the satellite (which are modulated on a different carrier frequency). The processed channels are routed to a demodulation and synchronization unit 56 whose output is a 1.536 mbps baseband signal. The transparent channels are routed to a similar demodulation and synchronization unit 58 whose output also consists of a 1.536 mbps baseband signal. The baseband signal from the unit 56 is applied to the input of a demultiplexer 60, which produces ninety-six 16 kbps output channels 61. These channels are subjected to FEC decoding, audio decoding and decryption in blocks 62. The channels 61 may be used alone or in combination to reproduce audio broadcasts of various quality levels or to provide information delivery services. Channels carrying audio information are subjected to digital-to-analog conversion (not shown) to produce audible signals that can be made available to airline passengers through headphones or loudspeakers. Typically, a large commercial aircraft is already provided with an audio distribution system 64 having outputs 65 at the individual passenger seats, and the decoded audio channels may be coupled to this system at inputs 66. The sound distribution 64 may also receive inputs 68 from audio tape systems or other auxiliary audio sources.

The output of the demodulation and synchronization unit 58 for the transparent downlink channels is applied to the input of an FEC decoder and decryption unit 72. The output of the unit 72 is a digital video signal which is subjected to digital-to-analog conversion (not shown) and applied to the input 73 of a video distribution system 74 carried by the aircraft. The video distribution system also receives inputs 75 from auxiliary video sources, such as video cassette players. Outputs 76 from the video distribution system 74 may be connected to shared video monitors or projection screens mounted near the ceiling of the aircraft cabin, or to individual LCD-type video displays provided at each passenger seat. The audio portion of a video program received by the video distribution system 74 is connected to the sound distribution system 64 via line 78. In order to enable information delivery services carried over the processed channels of the TDM downlink to be displayed by the video distribution system 74 of the aircraft, these channels are coupled to the video distribution system 74 via lines 80. In this way, stock quotes, news reports and other types of data can be visually displayed to the airline passengers.

Since the aircraft antenna 52 operates in the L band, it can be shared with other on-board receiving or transmitting equipment that operates in this band. For example, aircraft telephone services that operate over the INMARSAT satellite use frequencies in the L band.

As will be apparent from FIG. 1, the size of each spot beam 16 is such that an aircraft traversing its diameter will require several hours to pass through the beam, thus insuring continuity of major broadcast events for the airline passengers. It is also possible to transmit the same broadcast program in two (or even all three) of the spot beams 16 associated with a given satellite, thus insuring continuity over even longer flights. Although the spot beams 16 transmitted by a given satellite have different carrier frequencies, the carrier frequency of the RF front end unit 54 of FIG. 4 can be switched (either manually or automatically) via the input 53 as the aircraft 25 moves from one spot beam 16 to the next.

For live music, talk and news channels, it is anticipated that a group of airlines in each region can reach agreement on a set of channels that can be provided through the respective satellite 10, 12 or 14. Certain channels can be reserved for programs unique to each participating airline. For live information channels, the real time nature of the information delivery system allows the information content (news, stock quotes and the like) to be updated as frequently as desired. This can be done on common basis for channels which are shared by several airlines, or individually for channels that are reserved to particular airlines. Similarly, advertisements can be chosen by the participating airlines and can be placed on common or reserved channels. Although airlines may wish to offer most broadcast programs free of charge to their passengers, selected broadcast programs can be provided for a fee and billed to a credit card or debit card.

Although the present invention has been described with reference to a preferred embodiment thereof, it will be understood that the invention is not limited to the details thereof. Various substitutions and modifications have suggested in the foregoing description, and others will occur to those of ordinary skill in the art. All such substitutions and modifications are intended to be embraced within the scope of the invention as defined in the appended claims.

What is claimed is:

1. A system for providing real-time broadcast programs to aircraft passengers, comprising:

at least one terrestrial broadcast station for transmitting a plurality of different low-bandwidth broadcast programs and at least one high-bandwidth broadcast program;

at least one relay satellite for receiving and retransmitting said low-bandwidth broadcast programs and said at least one high-bandwidth broadcast program, said retransmission occurring on at least one downlink signal in which different ones of said low-bandwidth broadcast programs are transmitted on different time-division multiplex (TDM) channels at the same carrier frequency of less than about 3000 MHz; and a broadcast receiver carried on board an aircraft, said broadcast receiver including at least one demodulator for demodulating said at least one downlink signal and a demultiplexer coupled to said demodulator for demultiplexing said TDM channels to reproduce said plurality of low-bandwidth broadcast programs, said broadcast receiver being coupled to an on-board passenger entertainment system for providing said low-bandwidth broadcast programs and said at least one high-bandwidth broadcast program to passengers on board said aircraft.

2. A system as claimed in claim 1, wherein said at least one downlink signal contains an encrypted broadcast program, and wherein said broadcast receiver is adapted to decrypt said encrypted broadcast program.

3. A system as claimed in claim 1, wherein said at least one downlink signal comprises a spot beam which includes at least a portion of the flight path of said aircraft.

4. A system as claimed in claim 1, wherein said at least one downlink signal comprises a plurality of contiguous spot beams which collectively include at least a portion of the flight path of said aircraft, and wherein at least one of said broadcast programs is transmitted in more than one of said spot beams.

5. A system as claimed in claim 4, wherein said plural contiguous spot beams have different carrier frequencies, and wherein said broadcast receiver is switchable between or among said carrier frequencies.

6. A system as claimed in claim 1, wherein said carrier frequency is in the range of 1100 MHz to 2000 MHz.

7. An on-board system for providing a plurality of low-bandwidth broadcast programs and at least one high-bandwidth broadcast program to aircraft passengers, said low-bandwidth broadcast programs and said at least one high-bandwidth broadcast program being transmitted from at least one satellite on at least one downlink signal in which different ones of said low-bandwidth broadcast programs are transmitted on different time-division multiplex (TDM) channels at the same carrier frequency of less than about 3000 MHz, said on-board system comprising:

a satellite antenna carried by said aircraft for receiving said at least one downlink signal;

at least one demodulator coupled to said antenna for demodulating said at least one downlink signal;

a demultiplexer coupled to said demodulator for demultiplexing said TDM channels to reproduce said plurality of low-bandwidth broadcast programs; and a passenger entertainment system coupled to at least one of said demodulator and said demultiplexer for providing said low-bandwidth broadcast programs and said at least one high-bandwidth broadcast program to passengers on board said aircraft.

8. An on-board system as claimed in claim 7, wherein said at least one downlink signal contains an encrypted broadcast program, and wherein said on-board system is adapted to decrypt said encrypted broadcast program.

9. An on-board system as claimed in claim 7, wherein said on-board system is switchable between at least two different carrier frequencies.

10. An on-board system as claimed in claim 7, wherein said carrier frequency is in the range of 1100 MHz to 2000 MHz.

11. A method for providing real-time broadcast programs to aircraft passengers, comprising:

transmitting a plurality of different low-bandwidth broadcast programs and at least one high-bandwidth broadcast program from at least one terrestrial broadcast station to a relay satellite;

retransmitting said broadcast programs from said relay satellite to an aircraft in flight, said retransmission occurring on at least one downlink signal in which different ones of said low-bandwidth broadcast programs are transmitted on different time-division multiplex (TDM) channels at the same carrier frequency of less than about 3000 MHz; and receiving said downlink signal on board said aircraft and demultiplexing said TDM channels to reproduce said plurality of low-bandwidth broadcast programs and said at least one high-bandwidth broadcast program.

12. A method as claimed in claim 11, wherein said at least one downlink signal contains an encrypted broadcast program, and wherein said method further comprises the step of decrypting said encrypted broadcast program.

13. A method as claimed in claim 11, wherein said at least one downlink signal comprises a spot beam which includes at least a portion of the flight path of said aircraft.

14. A method as claimed in claim 11, wherein said at least one downlink signal comprises a plurality of contiguous spot beams which collectively include at least a portion of the flight path of said aircraft, and further comprising the step of transmitting at least one of said broadcast programs in more than one of said spot beams.

15. A method as claimed in claim 11, wherein said at least one downlink signal comprises a plurality of contiguous spot beams having different carrier frequencies, said contiguous spot beams collectively including at least a portion of the flight path of said aircraft, and wherein the step of receiving said downlink signal on board said aircraft comprises receiving different ones of said carrier frequencies at different times.

16. A method as claimed in claim 11, wherein said carrier frequency is in the range of 1100 MHz to 2000 MHz.

* * * * *